(12) United States Patent
Wu

(10) Patent No.: US 6,302,430 B1
(45) Date of Patent: Oct. 16, 2001

(54) FOLDABLE GOLF CART

(75) Inventor: Fang-Li Wu, Tainan (TW)

(73) Assignee: Sports World Enterprise Co., Ltd., Tainan Hsien (TW)

( * ) Notice: Subject to any disclaimer, the term of this patent is extended or adjusted under 35 U.S.C. 154(b) by 0 days.

(21) Appl. No.: 09/568,418

(22) Filed: May 10, 2000

(51) Int. Cl.[7] ............................................. B62B 1/04
(52) U.S. Cl. ............................................. 280/652; 280/646
(58) Field of Search ................................. 280/652, 650, 280/641, 639, 645, 646, 649, 651, 654, 655, 648, 655.1, 47.371, 47.17, 47.315, DIG. 5, DIG. 6, 47.26, 38, 42; 224/274; 248/96; D34/15

(56) References Cited

U.S. PATENT DOCUMENTS

| | | | |
|---|---|---|---|
| 5,464,238 | * | 11/1995 | Wu ........................................ 280/42 |
| 5,683,195 | * | 11/1997 | Liao ..................................... 403/102 |
| 5,704,629 | * | 1/1998 | Wu ...................................... 280/646 |
| 6,017,052 | * | 1/2000 | Wu ...................................... 280/646 |
| 6,120,054 | * | 9/2000 | Hu ....................................... 280/650 |
| 6,126,184 | * | 10/2000 | Liao ................................ 280/47.371 |
| 6,193,264 | * | 2/2001 | Seon .................................... 280/652 |
| 6,196,571 | * | 3/2001 | Chen et al. ......................... 280/647 |

* cited by examiner

*Primary Examiner*—Daniel G. DePumpo
*Assistant Examiner*—J. Allen Shriver
(74) *Attorney, Agent, or Firm*—Rosenberg, Klein & Lee

(57) ABSTRACT

A foldable golf cart includes a main support rod, a pair of wheel support rods, a connecting members, two connecting rods and a handle. The wheel support rods are pivoted to an intermediate portion of the main support rod, and each connected to a wheel. The connecting member is connected to an upper end of the main support rod. The handle is pivoted to an upper end portion of the main support rod. The connecting rods are each pivoted to the handle from one end, and pivoted to a respective one of the wheel support rods from other end. The handle has hooked portions separately engaging a depressing block of the connecting member. The handle is pivoted down to a folded position; thus, the connecting rods will at the same time move the wheel support rod to a folded position. The handle is pivoted upwards to an upright unfolded position; thus, the connecting rods will move the wheel support rods to an unfolded position. The depressing block fixes the handle in the upright position by engaging the hooked portion of the handle. The depressing block is disengaged from the hooked portion when depressed.

1 Claim, 6 Drawing Sheets

FOLDABLE GOLF CART

BACKGROUND OF THE INVENTION

The present invention relates to a foldable golf cart which can be easily folded to a smaller size for storage.

Foldable golf carts are convenient to use. There are many kinds of foldable golf carts available in the market. However, some of them are not very convenient to fold.

SUMMARY OF THE INVENTION

Therefore, it is a main object of the present invention to provide a foldable golf cart which can be folded in a very simple way.

The foldable golf cart of the present invention includes a main support rod member;

a pair of wheel support rods; the wheel support rods being pivoted to the intermediate part of the main support rod member;

two wheels; the wheels being each fitted to a respective one of the wheel support rods;

a connecting member; the connecting member being connected to an upper end portion of the main support rod member; the connecting member having a depressing block movably received in a holding room of the connecting member; the depressing block having two locking rods on two sides thereof; the depressing block is biased upwardly of the holding room by a spring;

a handle; the handle having two hooked portions and a lower end portion; the handle lower end portion being pivoted to the upper end portion of the main support rod member; the hooked portions being passed into the holding room of the connecting member, and engaging a respective one of the locking rods of the depressing block to fix the handle when the handle is pivoted to an upright position; the depressing block being capable of be depressed for the locking rods to be disengaged from the hooked portions of the handle; permitting the handle to be pivoted down to a folded position;

two connecting rods; the connecting rods being each pivoted to the handle from one end, and pivoted to a respective one of the wheel support rods from other end; the connecting rods can move the wheel support rods to a folded position when the handle is pivoted down, and can move the wheel support rods to an unfolded position when the handle is pivoted up to the upright position.

BRIEF DESCRIPTION OF THE DRAWINGS

The present invention will be better understood by reference to the accompanying drawings, wherein.

DETAILED DESCRIPTION OF THE PREFERRED EMBODIMENT

Figure 1:
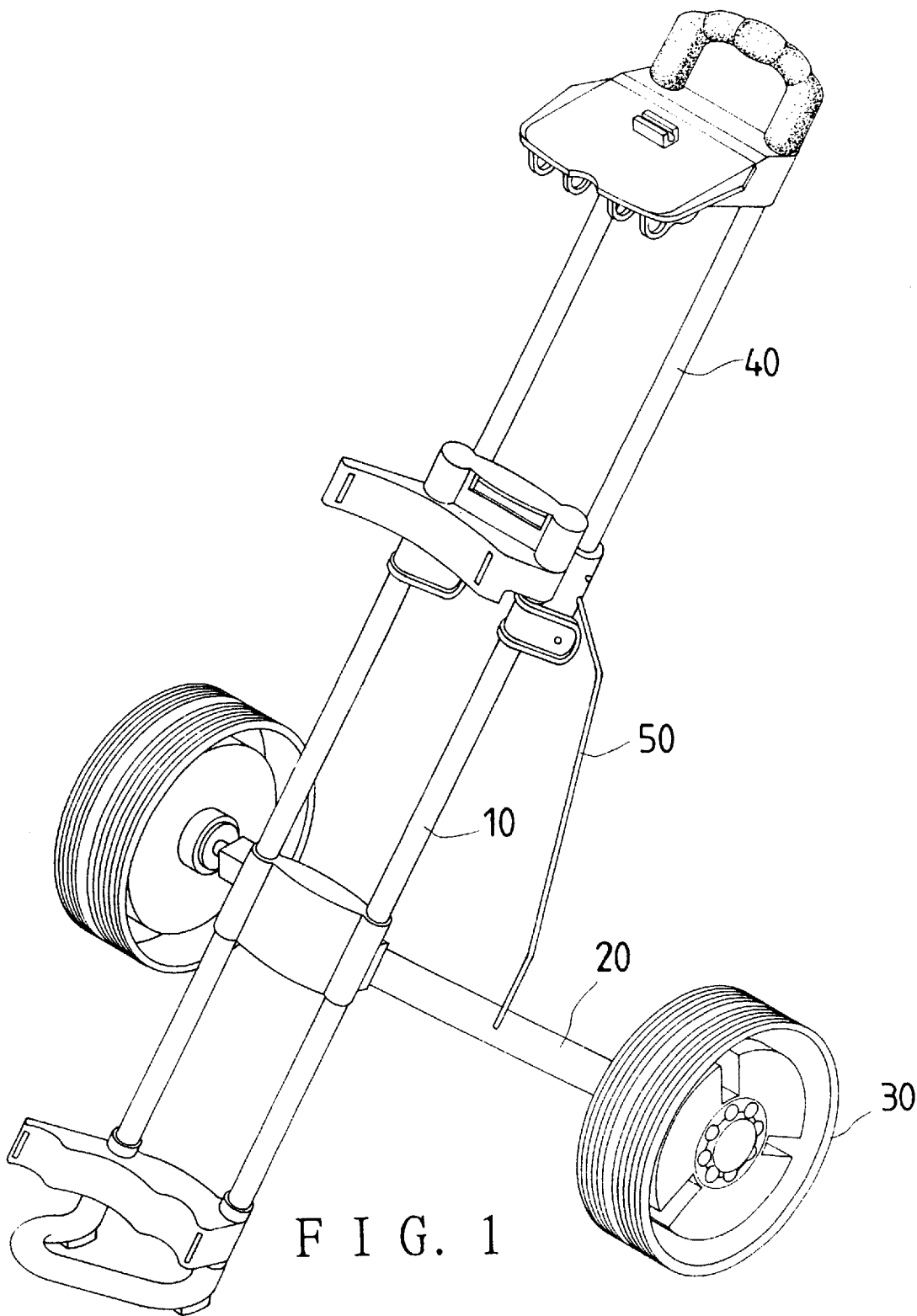
FIG. 1 is a view of the foldable golf cart of the present invention in an unfolded in-use position.
Figure 2:
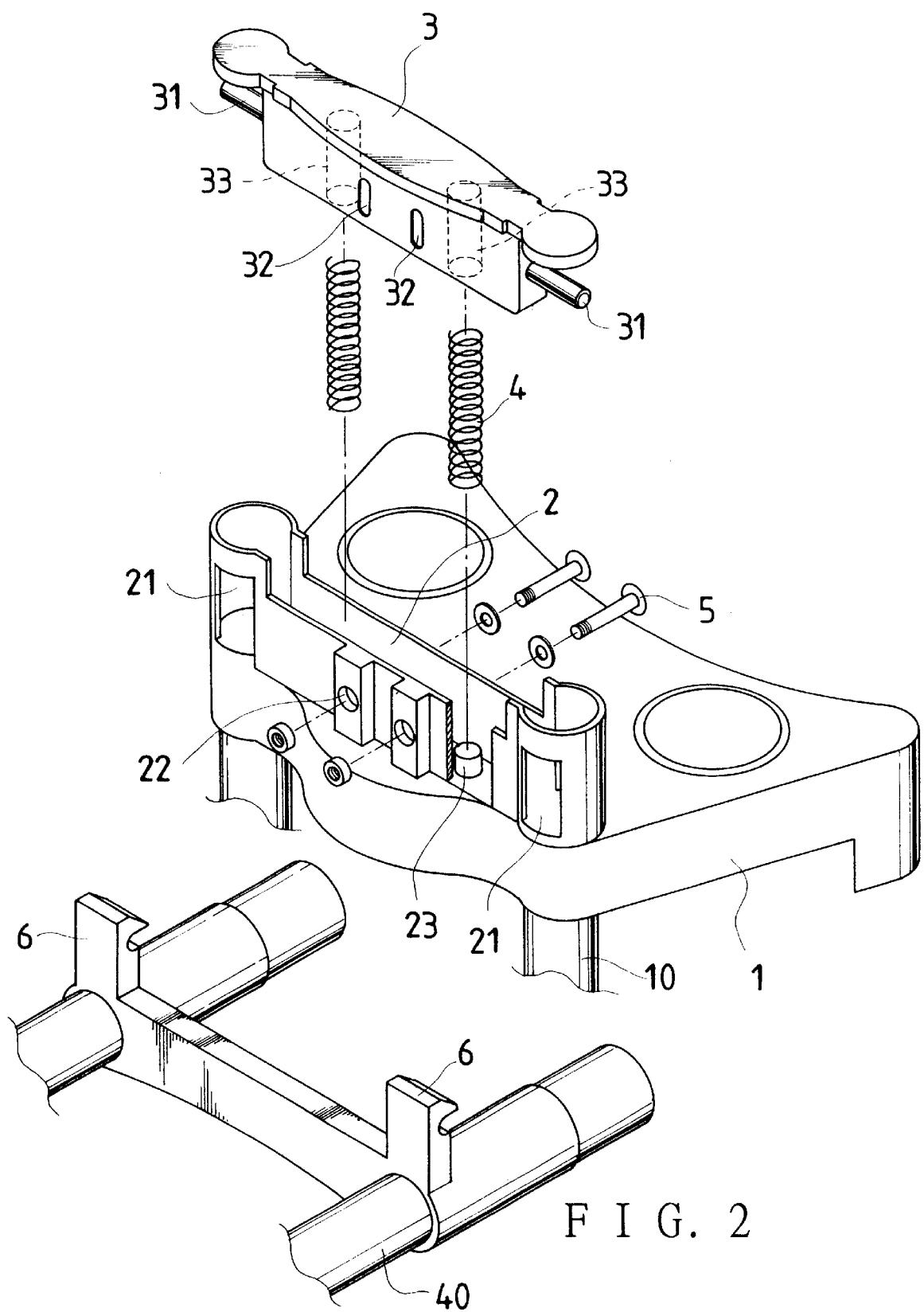
FIG. 2 is an exploded perspective view of the connecting member of the foldable golf cart of the present invention.
Figure 3:
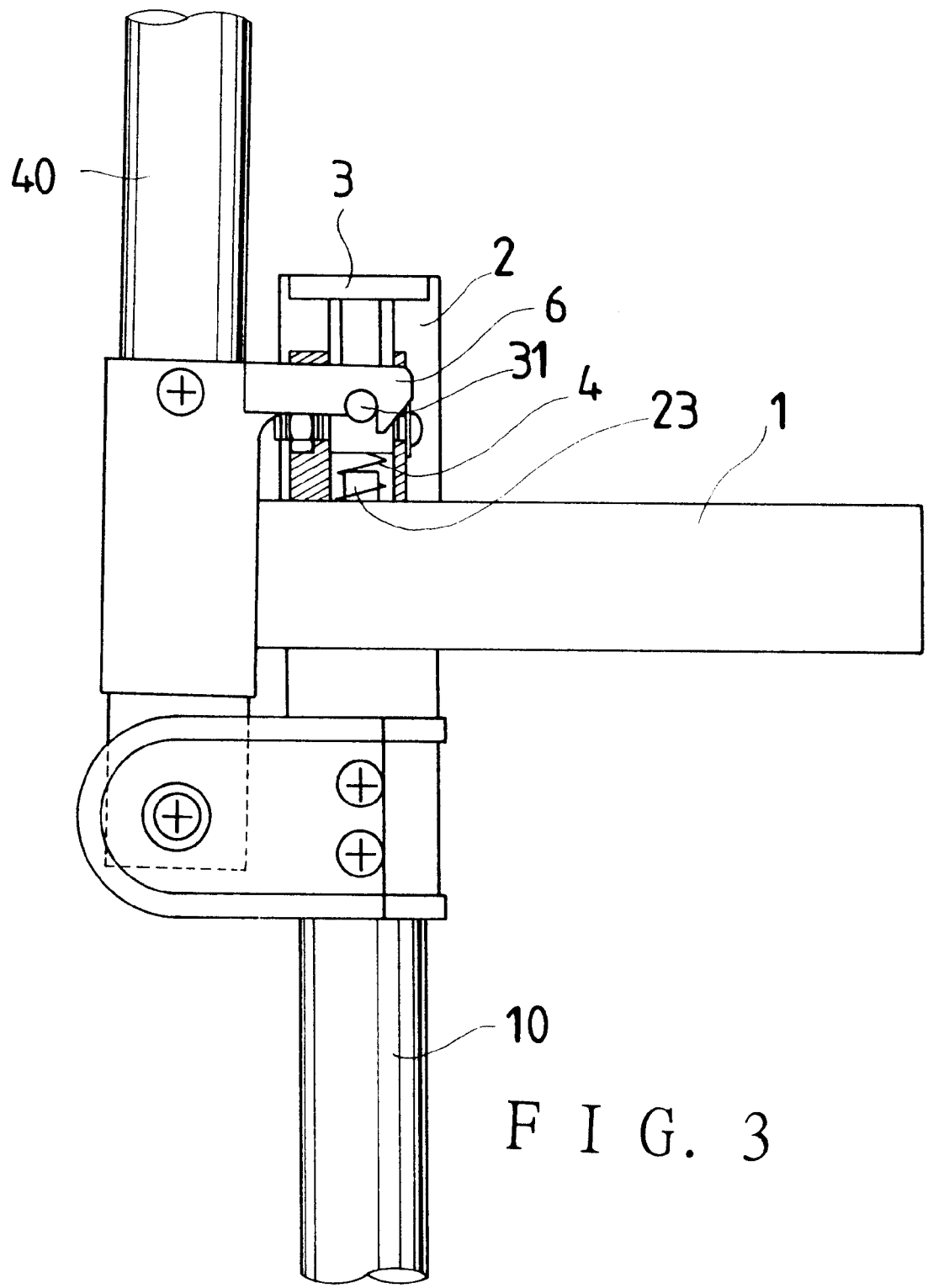
FIG. 3. is a fragmentary view of the foldable golf cart of the present invention.

Referring to FIGS. 1, 2 and 3, a foldable golf cart of the present invention includes a main support rod 10, wheel support rods 20, wheels 30, a handle 40, a pair connecting rods 50 and a connecting member 1.

The wheel support rods 20 are pivoted to intermediate portions of the main support rods 10. The wheels 30 are fitted to outer ends of the wheel support rods 20. The connecting member 1 is connected to upper ends of the main support rods 10. Referring specifically to FIG. 3, lower end portions of the handle 40 are pivoted to the main support rods 10. The connecting rods 50 are each pivoted to a respective one of the lower end portions of the handle 40 from an upper end of the connecting rod 50, and pivoted to a respective one of the wheel support rods 20 from a lower end portion of the connecting rod 50 such that the connecting rods 50 can move the wheel support rods 20 between a stretched in-use position and a folded not-in-use position when the handle 40 is pivoted on the main support rod 10.

Referring to FIGS. 2 and 3 again, the connecting member 1 has a holding room 2 defined by a wall (not numbered) on an upper side thereof. The wall has two openings 21 and two through holes 22. Two locating protrusions 23 are formed within the holding room 2 on the connecting member 1. The connecting member 1 further has a depressing block 3. The depressing block 3 has two receiving holes 33, two elongated holes 32 and two locking rods 31 each on one side of the depressing block 3. The depressing block 3 is movably received in the holding room 2 of the connecting member 1 with springs 4 inserted into the receiving holes 33 from upper end portions of the springs 4. The locating protrusions 23 are each inserted into a respective one of the springs 4 from lower end portions of the springs 4. Thus, the depressing block 3 is biased upwardly by the springs 4. Each of the through holes 22 and a corresponding one of the elongated holes 32 of the depressing block 3 have a bolt 5 passed therethrough such that the depressing block 3 will not falling off the holding room 2.

The locking rods 31 each communicates with a respective one of the openings 21 of the wall of the holding room 2. The handle 40 has hooked portions 6 on the lower end portions. Referring specifically to FIG. 3, the hooked portions 6 each passes through a respective one of the openings 21 and engages a respective one of the locating rods 31 of the depressing block 3 to locate the handle 40 when the handle 40 is pivoted on the main support rods 10 upwards to an upright position; when the handle 40 is pivoted to the upright position, the wheel support rods 20 will be stretched to the in-use position by the connecting rods 50.

Figure 4:
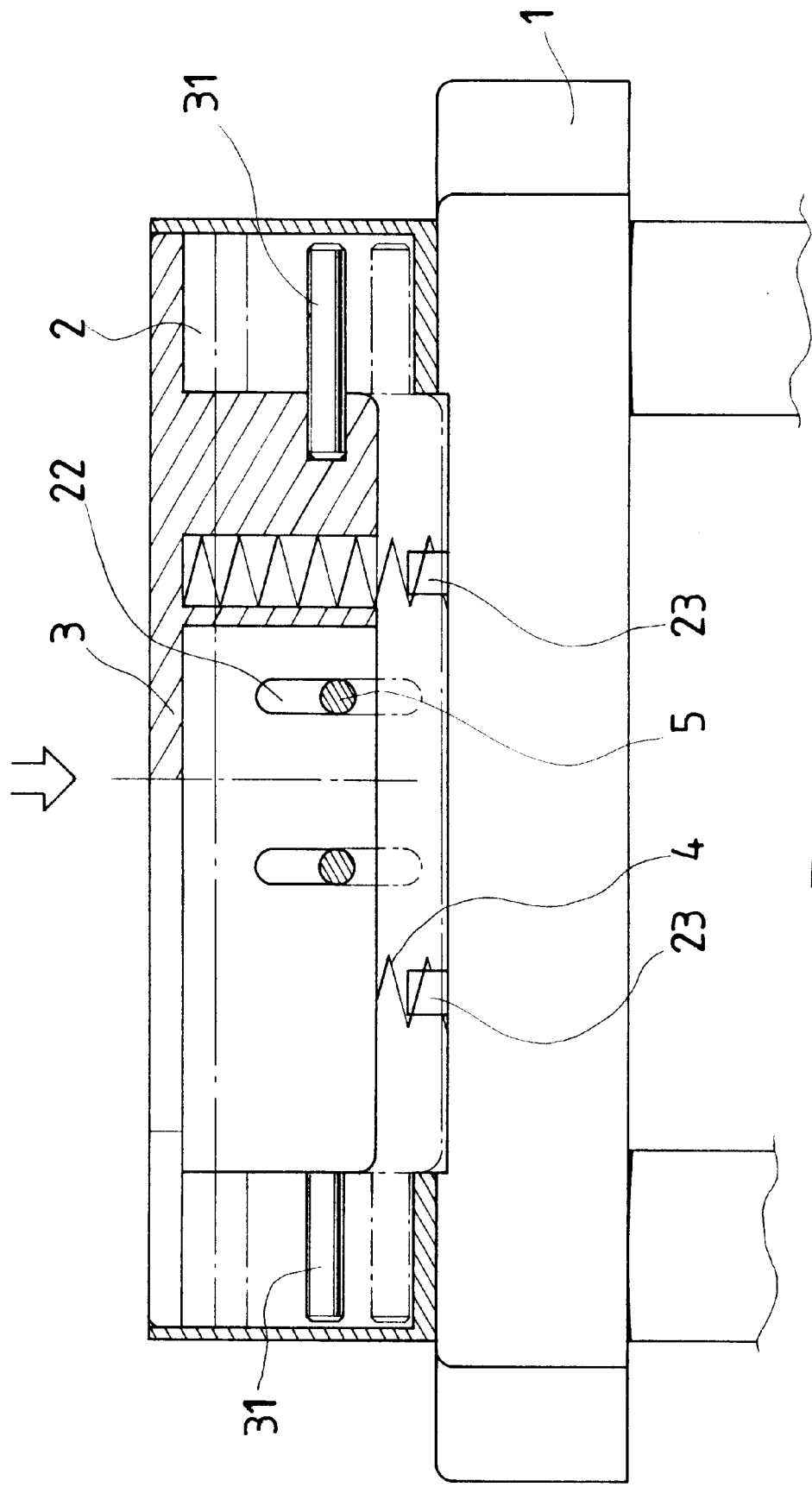
FIG. 4 is a front view of the connecting member of the foldable golf cart of the present invention, with the depressing block being depressed.
Figure 5:
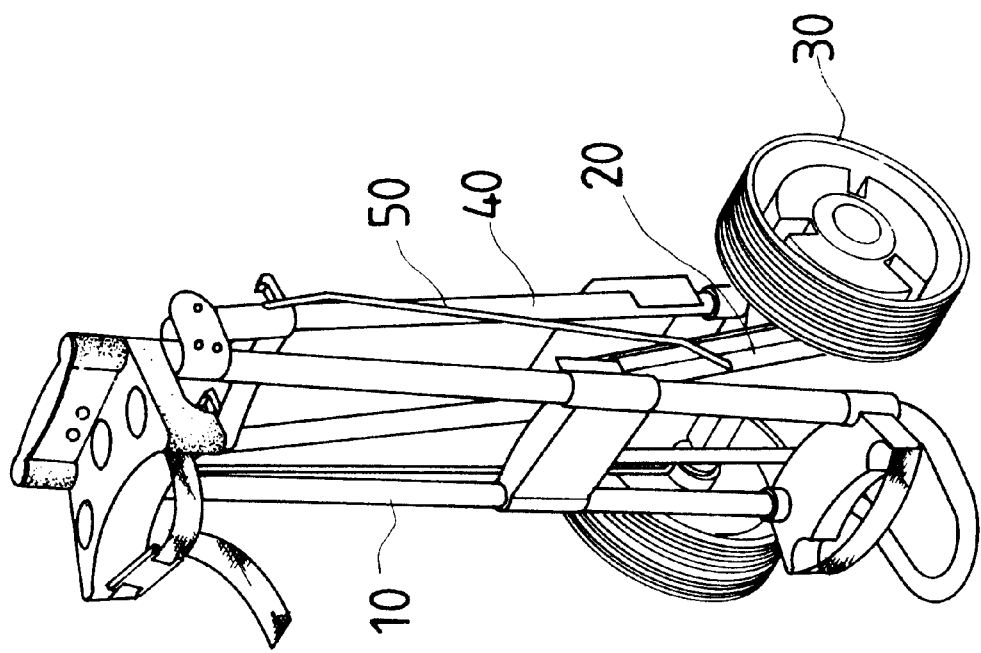
FIG. 5 is a perspective view of the foldable golf cart of the present invention in a folded position.
Figure 6:
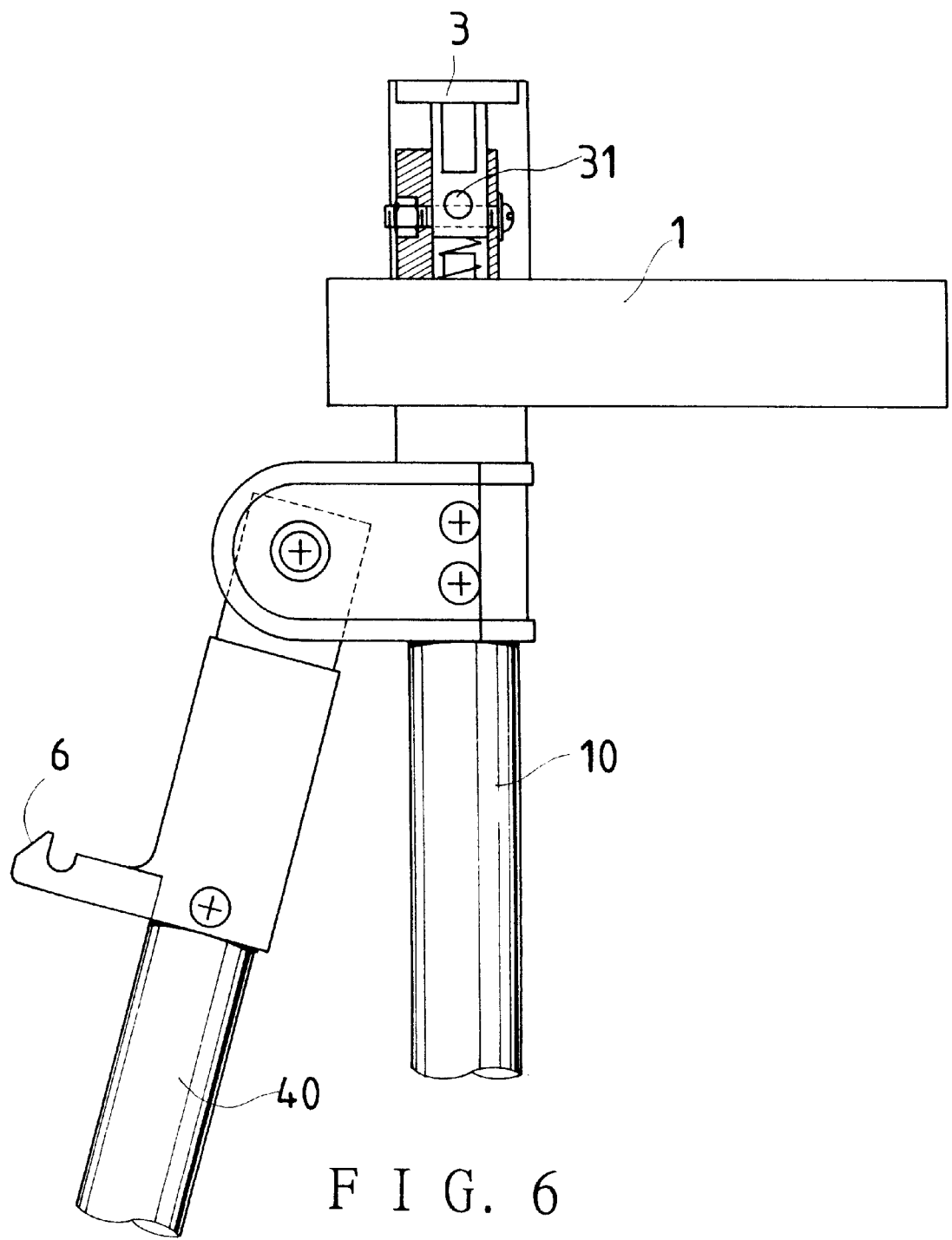
FIG. 6 is a fragmentary side view of the foldable golf cart of the present invention.

In folding the golf cart, referring to FIGS. 4, 5, and 6, first tile depressing block 3 is depressed to disengage the lock rods 31 of the depressing block 3 from the hooked portions 6 of the handle 40. Then, the handle 40 is pivoted downwards until the handle 40 is disposed adjacent to the main support rod 10; the connecting rods 50 will at the same time move the wheel support rods 20 to the folded not-in-use position. Thus, the golf cart is folded.

When the handle 40 is pivoted back to the upright position, and hooked portion 6 will engage the locking rods 31 of the depressing block 3 again to fix the handle 40 in position.

The connecting member 1 of the present invention can also be used in a golf cart which has a single main support rod and a handle made of a single rod.

From the above description, the foldable golf cart can be known to be able to be folded and stretched very fast and easily.

What is claimed is:

1. A foldable golf cart, comprising (1) a main support rod member, said main support rod member having an intermediate part and an upper end portion;

(2) a pair of wheel support rods, said wheel support rods being pivoted to said intermediate part of said main support rod member;

(3) two wheels, said wheels being each fitted to a respective one of said wheel support rods;

(4) a connecting member, said connecting member being connected to said upper end portion of said main support rod member, said connecting member having (i) a holding room, said holding room being defined by a wall thereof; said wall having two openings and two through holes;

(ii) a depressing block, said depressing block having two locking rods on two sides thereof said depressing block having two elongated holes, said depressing block being disposed in said holding room with springs located under said depressing block for biasing said depressing block upwardly; each of said elongated holes of said depressing block and a corresponding one of said through holes of said wall having a bolt passed therethrough for preventing said depressing block from falling off said holding room; said depressing block being capable of moving along said elongated holes, said locking rods of said depressing block facing a respective one of said openings of said wall;

(5) a handle, said handle having two hooked portions and a lower end portion; said lower end portion of said handle being pivoted to said upper end portion of said main support rod member, said hooked portions each being passed through a respective one of said openings of said wall, and engaging a respective one of said locking rods of said depressing block to fix said handle when said handle is pivoted to an upright position, said depressing block being depressed to disengage said locking rods from said hooked portions of said handle for permitting said handle to be pivoted down to a folded position;

(6) a pair of connecting rods, said connecting rods being each pivoted to said upper end portion of said handle from one end and pivoted to a respective one of said wheel support rods from other end, said connecting rods being capable of moving said wheel support rods to an unfolded position when said handle is pivoted to said upright position, said connecting rods being capable of moving said wheel support rods to a folded position when said handle is pivoted to said folded position of said handle.

* * * * *